US006247063B1

United States Patent
Ichimi et al.

(10) Patent No.: US 6,247,063 B1
(45) Date of Patent: *Jun. 12, 2001

(54) NETWORK TERMINAL EQUIPMENT CAPABLE OF ACCOMMODATING PLURALITY OF COMMUNICATION CONTROL UNITS

(75) Inventors: Masahiro Ichimi; Kenichi Mori; Hideyuki Koinuma, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/108,183

(22) Filed: Jul. 1, 1998

Related U.S. Application Data (62) Division of application No. 08/588,008, filed on Jan. 17, 1996, now Pat. No. 6,058,446.

(30) Foreign Application Priority Data

Feb. 23, 1995 (JP) .................................................. 7-034812

(51) Int. Cl.⁷ ...................................................... G06F 15/16
(52) U.S. Cl. .......................... 709/250; 709/220; 709/221; 709/222; 709/228; 709/321; 709/327; 710/100; 710/104; 340/825; 340/825.01; 370/463; 375/219; 375/220; 375/222
(58) Field of Search ..................................... 709/220, 221, 709/222, 228, 250, 321, 327; 710/100, 104; 340/825, 825.01; 370/463; 375/219, 220, 222

(56) References Cited

U.S. PATENT DOCUMENTS

| | | | |
|---|---|---|---|
| 4,254,473 | 3/1981 | Galdum et al. | 395/822 |
| 5,230,058 | 7/1993 | Kumar et al. | 395/833 |
| 5,485,590 | 1/1996 | Hyatt et al. | 395/442 |
| 5,535,328 | 7/1996 | Harari et al. | 395/185.05 |
| 5,561,815 | 10/1996 | Takata et al. | 395/883 |
| 5,564,033 | 10/1996 | Takekuma et al. | 395/442 |
| 5,586,270 | 12/1996 | Rotier et al. | 395/282 |
| 5,590,374 | * 12/1996 | Shariff et al. | 710/9 |
| 5,592,652 | 1/1997 | Hogo et al. | 395/497.01 |
| 5,604,917 | 2/1997 | Saito et al. | 395/869 |
| 5,845,590 | * 12/1998 | Seidl | 108/147 |
| 6,003,097 | * 12/1999 | Richman et al. | 710/8 |
| 6,049,825 | * 4/2000 | Yamamoto | 709/221 |
| 6,058,446 | * 5/2000 | Ichimi et al. | 710/104 |

FOREIGN PATENT DOCUMENTS

| | | |
|---|---|---|
| 0 418 658 | 3/1991 | (EP) . |
| 2 241 854 | 9/1991 | (GB) . |
| 3-296344 | 12/1991 | (JP) . |

* cited by examiner

Primary Examiner—Meng-Al T. An
Assistant Examiner—Saleh Najjar
(74) Attorney, Agent, or Firm—Staas & Halsey LLP (57) ABSTRACT

A LAN terminal equipment comprises a plurality of slots, each capable of accommodating a LAN control board, at least one ROM socket capable of holding a MAC ROM, and an input/output control unit. The input/output control unit determines a correspondence between the LAN control board and the MAC ROM, thereby ensuring the uniqueness of MAC address and also making a primary/spare dual configuration possible.

20 Claims, 9 Drawing Sheets

NETWORK TERMINAL EQUIPMENT CAPABLE OF ACCOMMODATING PLURALITY OF COMMUNICATION CONTROL UNITS

CROSS-REFERENCE TO RELATED APPLICATION

This is a division of application Ser. No. 08/588,008 filed Jan. 17, 1996, now U.S. Pat. No. 6,058,446.

BACKGROUND OF THE INVENTION

1. Field of the Invention

The present invention relates to a network terminal equipment wherein a plurality of communication control units can be installed in one terminal equipment, such as a workstation or the like, and more particularly to network terminal equipment, such as a workstation, that can accommodate a plurality of communication control units to permit connection by a plurality of protocols and/or to realize a dual configuration of the communication control unit.

2. Description of the Related Art

Each terminal equipment connected to a local area network (LAN), such as an Ethernet or an FDDI (fiber distributed data interface) network, is assigned a medium access control (MAC) address for uniquely identifying the terminal equipment in the network.

Conventionally, the MAC address has been assigned to each individual LAN control unit that is plugged into a slot in a workstation and that controls transmission and reception to and from LAN transmission channels. The MAC address is written in a ROM or like memory which is mounted on the LAN control unit. The reason that the MAC address is stored in a ROM or like memory is to prevent accidental alteration of the MAC address that could lead to a malfunction in the network.

If the LAN control unit has failed, it has to be replaced with a new unit. Since the same MAC address as that of the failed unit must be assigned to the new unit, the ROM holding the MAC address (hereinafter referred to as the MAC ROM) has to be removed from the failed unit and mounted on the new unit.

Previously, it has sometimes practiced to install the MAC ROM in the workstation itself, not on the LAN control unit. In such cases, if the LAN control unit has failed, it is simply replaced with a new unit.

If the known method described above is to be adopted for a workstation capable of accommodating a plurality of LAN control units in its slots to permit connection by a plurality of protocols and/or to realize a primary/spare dual configuration with two LAN control units, the workstation itself must be constructed to accommodate a plurality of MAC ROMs to correspond with the plurality of LAN control units. Furthermore, the plurality of MAC ROMs must have a one-to-one correspondence with the plurality of LAN control units to ensure the uniqueness of the MAC address. Moreover, when two LAN control units are used in a dual configuration, one as the primary and the other as the spare, the two control units must be constructed to be able to access a common MAC ROM, while disabling or prohibiting the operation of the spare LAN control unit by some means in order to ensure the uniqueness.

SUMMARY OF THE INVENTION

It is an object of the present invention to provide a construction that facilitates the replacement of communication control units for a network terminal equipment capable of accommodating a plurality of communication control units.

It is another object of the present invention to provide means for ensuring the uniqueness of a MAC address for a network terminal equipment capable of accommodating a plurality of communication control units.

According to the present invention, there is provided a network terminal equipment comprising: a plurality of slots each capable of accommodating a communication control unit; at least one socket for holding therein a memory device where fixed data is stored that is used by each of the plurality of communication control units installed in the slots; and an input/output control unit for determining a correspondence between the communication control units installed in the slots and the memory device mounted in the socket.

DESCRIPTION OF THE PREFERRED EMBODIMENTS

Figure 1:
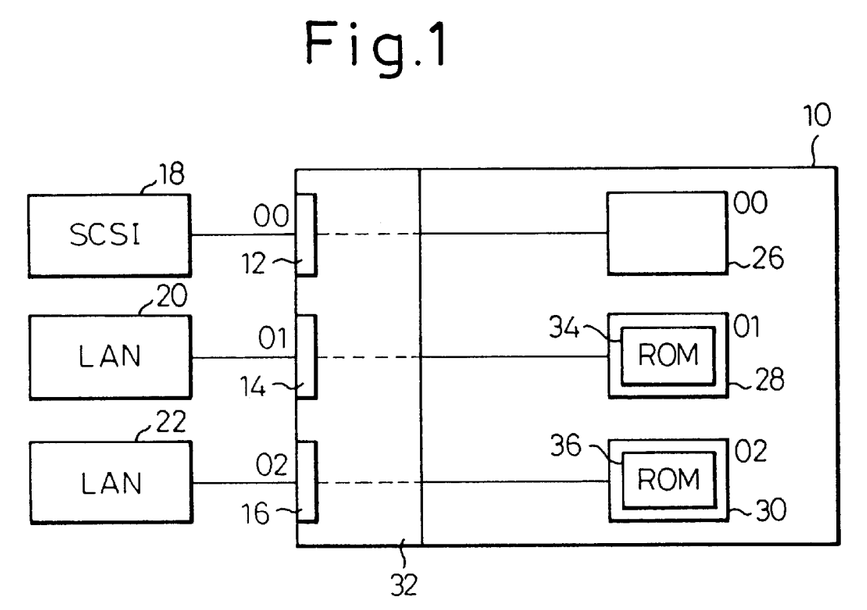
FIG. 1 is a block diagram of a LAN terminal equipment according to a first embodiment of the present invention.

FIG. 1 is a block diagram of a LAN terminal equipment according to a first embodiment of the present invention. As an example, the LAN terminal equipment 10 shown here includes slots 12, 14, and 16 with slot IDs 00, 01, and 02, and ROM sockets 26, 28, and 30 with ROM IDs 00, 01, and 02. When a LAN control board inserted in a slot whose slot ID is i (=00, 01, 02, . . . ) tries to access a MAC ROM, an I/O control unit 32, as conceptually shown in FIG. 1, controls input/output channels so that the LAN control board accesses the MAC ROM mounted in a ROM socket whose ROM ID is i.

In the example shown in FIG. 1, the slot 12 of slot ID 00 is mounted with a SCSI (small computer systems interface) board 18 which does not require a MAC ROM; therefore, no MAC ROM is mounted in the ROM socket 26 whose ROM ID is 00. On the other hand, the slot 14 of slot ID 01 is mounted with a LAN control board 20, so that a MAC ROM 34 for the LAN control board 20 is mounted in the ROM socket 28 whose ROM ID is 01. Likewise, the slot 16 of slot ID 02 is mounted with a LAN control board 22, so that a MAC ROM 36 for the LAN control board 22 is mounted in the ROM socket 30 whose ROM ID is 02.

Figure 2:
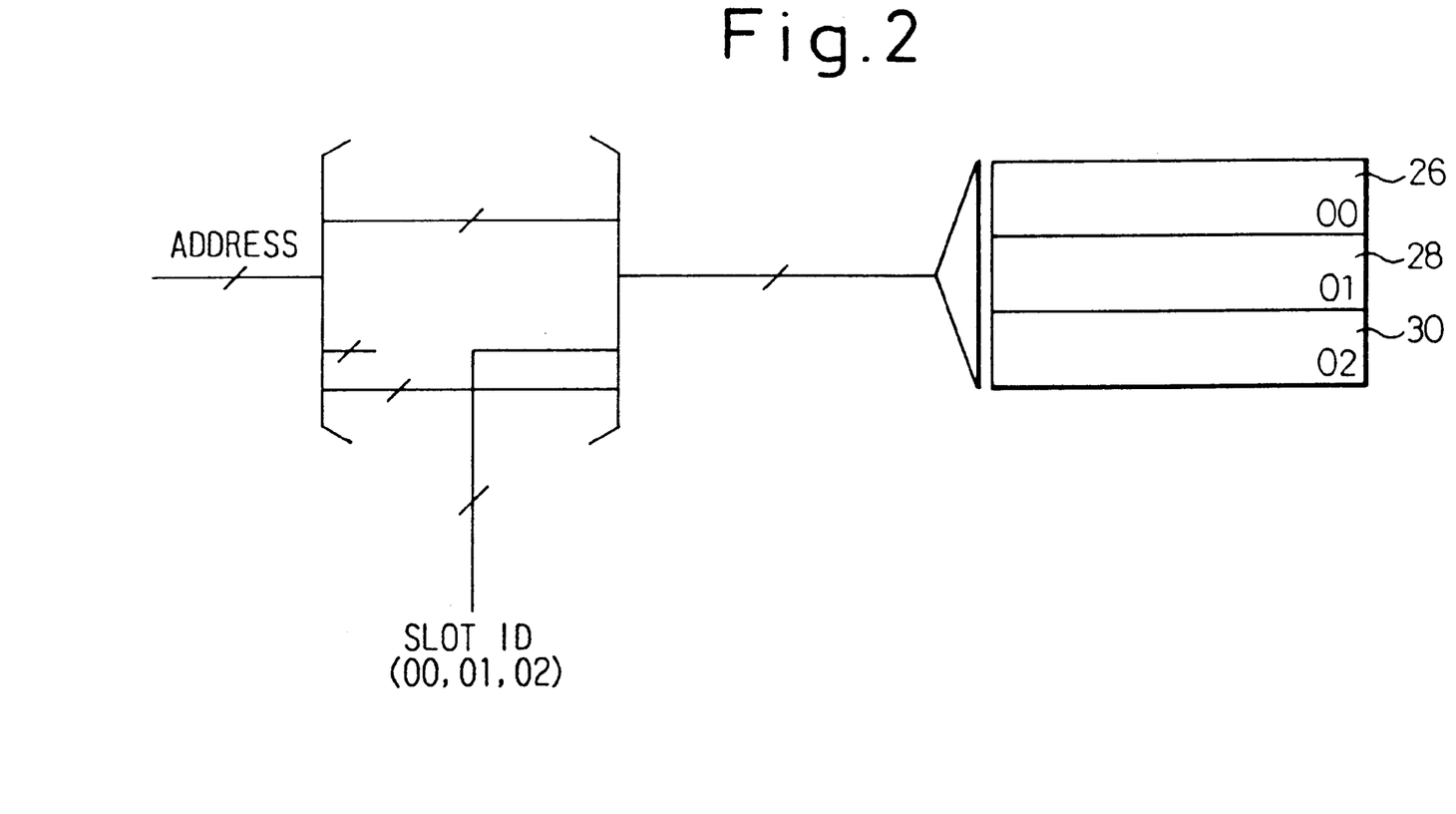
FIG. 2 is a diagram showing the details of an I/O control unit 32 in FIG. 1.

The function of the I/O control unit 32 conceptually shown in FIG. 1 is implemented, for example, by making connections as shown in FIG. 2. The MAC ROMs mounted in the ROM sockets 26, 28, and 30 in FIG. 2 are mapped in an address space in decreasing order of their ROM IDs. When the board installed in each slot accesses its associated MAC ROM, some of the bits constituting the address output from the board are replaced by the value of the slot ID of that slot.

In the LAN terminal equipment shown in FIG. 1, since the slots have a one-to-one correspondence with the MAC ROM sockets, the uniqueness of the MAC address is retained. Furthermore, since the MAC ROMs are installed in the LAN terminal equipment 10 itself, the MAC ROMs need not be replaced when replacing the LAN control boards. However, there is a possibility that an unused address space and ROM socket may occur, as indicated by ROM socket 26 shown in FIG. 1.

Figure 3:
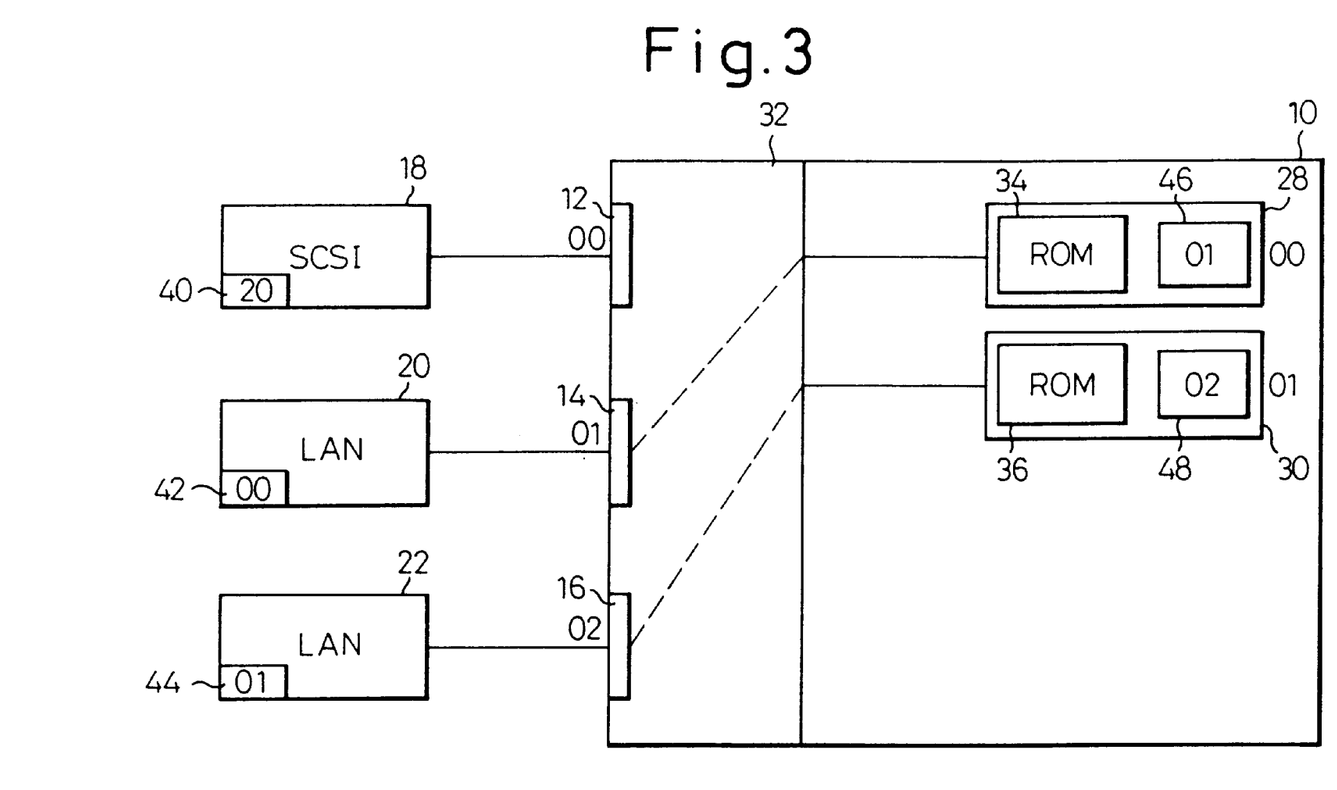
FIG. 3 is a block diagram of a LAN terminal equipment according to a second embodiment of the present invention.

FIG. 3 is a block diagram of a LAN terminal equipment according to a second embodiment of the present invention. The elements corresponding to those shown in FIG. 1 are designated by like reference numerals. The LAN terminal equipment shown in FIG. 3 includes memories 40, 42, and 44 for storing the values of the ROM IDs for identifying the MAC ROMs provided in corresponding relationship to and for use by the respective boards 18, 20, and 22 installed in the slots 12, 14, and 16, and memories 46 and 48, provided in corresponding relationship to the ROM sockets 28 and 30, for storing the values of the slot IDs for identifying the slot IDs of the slots in which the boards that use the respective MAC ROMs are installed. In FIG. 3, the memories 40, 42, and 44 are shown as if they are mounted on the respective boards, but it will be appreciated that these memories can be mounted inside the terminal equipment 10 itself.

Suitable values are stored as environment settings in the memories 40, 42, 44, 46, and 48 by an operator's operation, etc. In the example shown in FIG. 3, as in the example of FIG. 1, the SCSI board 18 and the LAN control boards 20 and 22 are installed in the slots 12, 14, and 16, respectively. Since the SCSI board 18 does not require a MAC ROM, a meaningless value "20" is stored as a ROM ID value in its associated memory 40. Since the LAN control board 20 uses the MAC ROM 34, a ROM ID value "00" is stored in the memory 42. Likewise, since the LAN control board 22 uses the MAC ROM 36, a ROM ID value "01" is stored in the memory 44. With this setting, the MAC ROM 34 is referred to by the LAN control board 20, while the MAC ROM 36 is referred to by the LAN control board 22. In the LAN terminal equipment of FIG. 3, an unused address space or an unused ROM socket does not occur.

The memories 46 and 48 are provided for the MAC ROMs in order to ensure the uniqueness of the MAC address. As an example, consider a case where the LAN control boards 20 and 22 are erroneously set to use the same MAC ROM 34. Even in such a case, only the LAN control board installed in the slot identified by the contents of the memory 46 is allowed to access the MAC ROM 34. When an attempt to access one or the other of the MAC ROMs is detected, the I/O control unit 32 compares the slot ID of the slot where the board that made the attempt is installed with the slot ID stored in corresponding relationship to the MAC ROM to which an access was attempted; when they match, the access is allowed, but when they do not match, the access is interpreted as an abnormal operation and an interrupt is issued to the CPUs in the LAN control board side and the terminal equipment 10 side.

Figure 4:
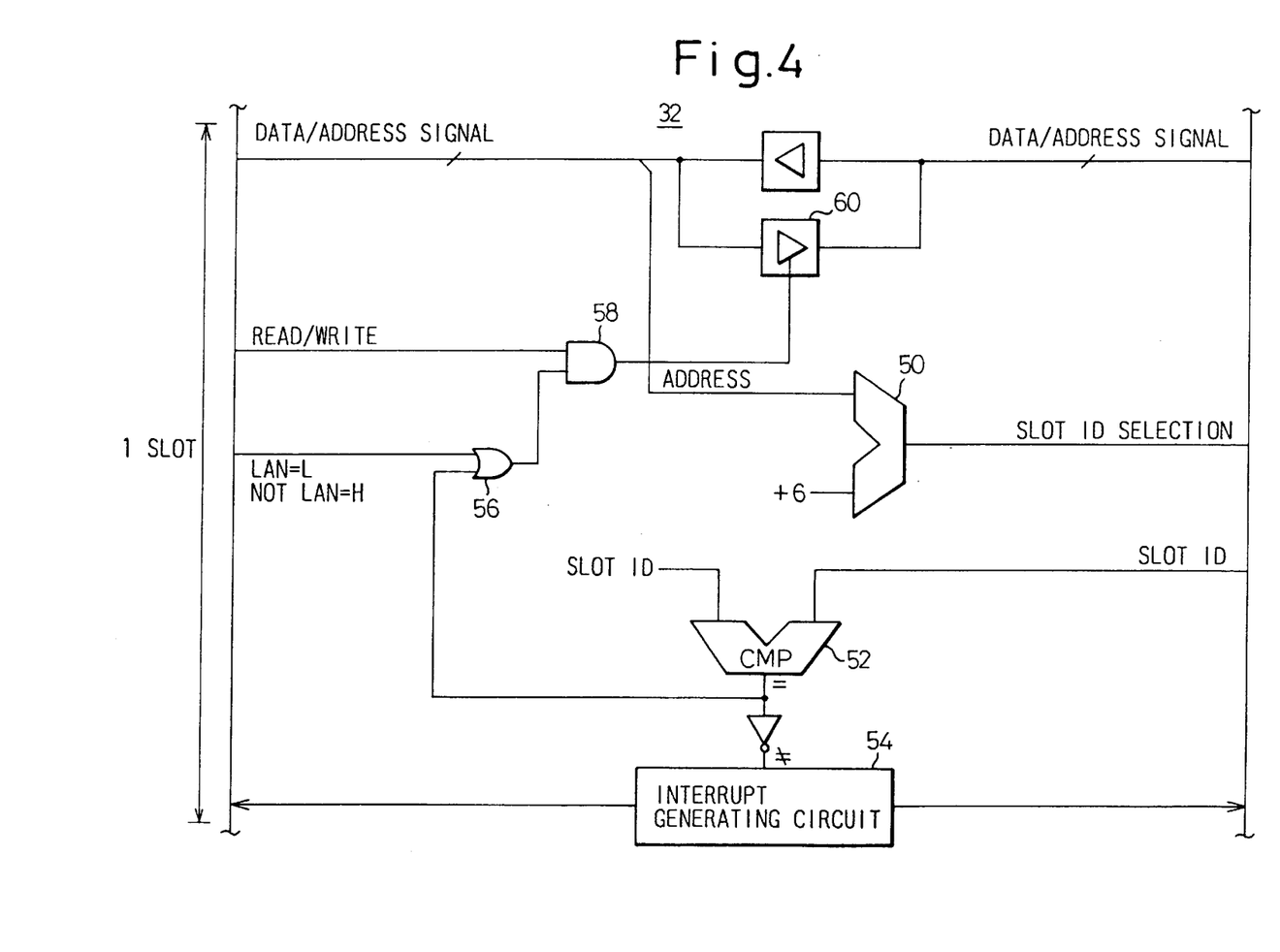
FIG. 4 is a diagram showing the details of an I/O control unit 32 in FIG. 3.
Figure 5:
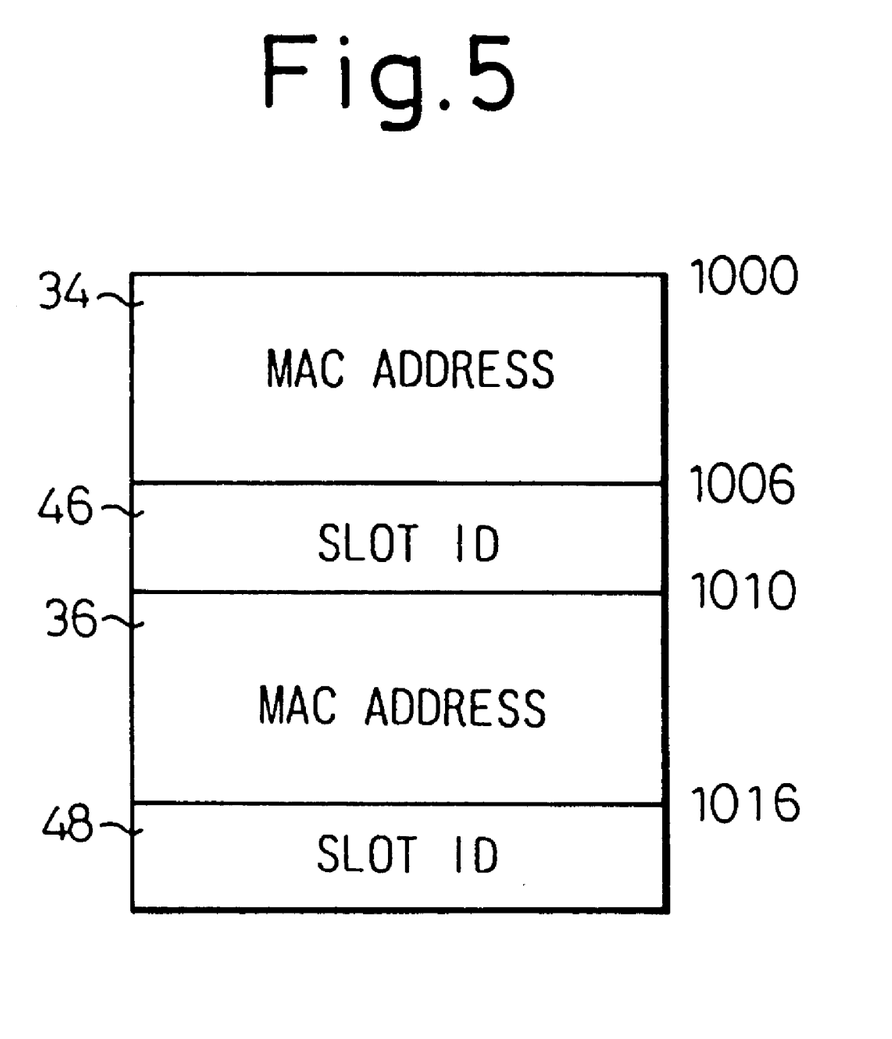
FIG. 5 is a memory mapping diagram for the LAN terminal equipment of FIG. 3.

FIG. 4 shows an example of a detailed configuration of the I/o control unit 32 for implementing the above function. The MAC ROMs, 34 and 36, and the memories, 46 and 48, for storing their associated slot IDs, are mapped in an address space in alternate fashion as shown in FIG. 5. An adder 50 adds 6 to an address used to access the MAC ROM and thereby generates an address for reading the slot ID. The slot ID thus read out is compared in a comparator 52 with the slot ID of the current slot. If the two slot IDs do not match, an interrupt generating circuit 54 causes an interrupt to the CPUs on the LAN control board and in the terminal equipment 10. At the same time, one input of an OR gate 56 is driven low. When a LAN control board is already installed in the slot, the other input of the OR gate 56 is low, so that the output of the OR gate is low, which causes an AND gate 58 to close. As a result, a buffer 60 provided in an outgoing path from the LAN control board to the terminal equipment does not conduct even when a read/write signal is output from the LAN control board, thus preventing the malfunctioning of the LAN control board from causing an adverse effect on the terminal equipment.

If the slot ID of the slot matches the slot ID read out of the terminal equipment as a result of the comparison in the comparator 52, the output of the OR gate 56 goes high, and the AND gate 58 is opened. This allows data to flow from the LAN control board to the terminal equipment. If the board installed in the slot is not a LAN control board, the output of the OR gate 56 is high regardless of the level of the other input thereof, so that data flow from the board to the terminal equipment is allowed.

In the LAN terminal equipment described with reference to FIGS. 3 to 5, the ROM IDs for identifying the MAC ROMs used are stored for the respective LAN control boards installed, as previously described. For the MAC ROMs also, the slot IDs for identifying their associated LAN control boards are stored. This ensures the uniqueness of the MAC address.

Figure 6:
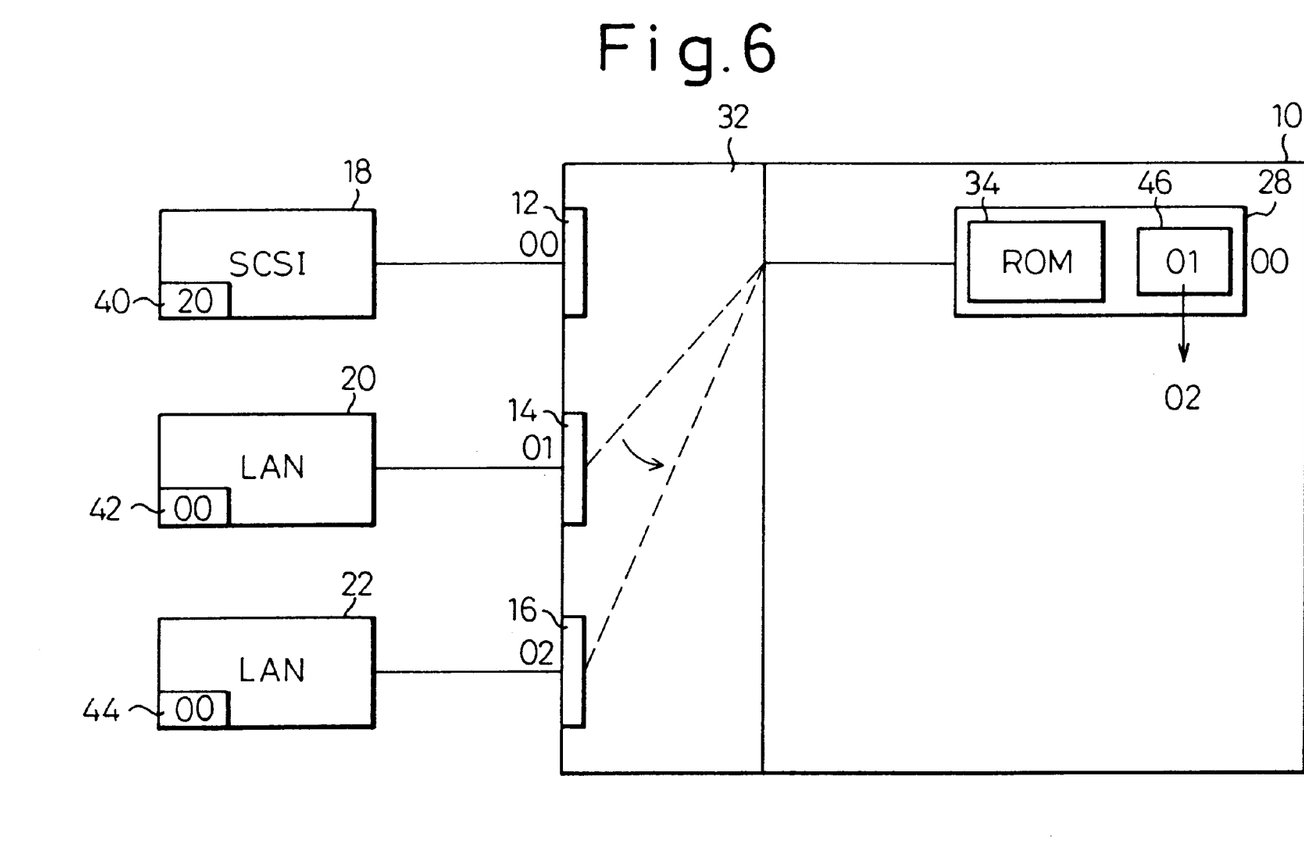
FIG. 6 is a diagram for explaining primary/spare switching in the LAN terminal equipment of FIG. 3.

In the LAN terminal equipment of FIG. 3, if the ROM IDs of the LAN control boards 20 and 22 installed in the slots of slot IDs "01" and "02" are both set to "00" and the slot ID of the MAC ROM whose ROM ID is "00" is set to "01", as shown in FIG. 6, the LAN terminal equipment can be constructed in a dual LAN control board configuration with the LAN control board 20 as a primary board and the LAN control board 22 as a spare. In the event of failure of the primary LAN control board, the contents of the memory 46 is altered from "01" to "02" by automatic means or by a manual operation by the operator, thereby accomplishing the switching from the primary to the spare board.

In the dual-configuration LAN terminal equipment described with reference to FIG. 6, since the operation of the LAN control board designated as the spare is initially disabled, when making the primary-to-spare switching it is necessary to terminate the current communication session first and then initiate a new session after the switching has been made.

Figure 7:
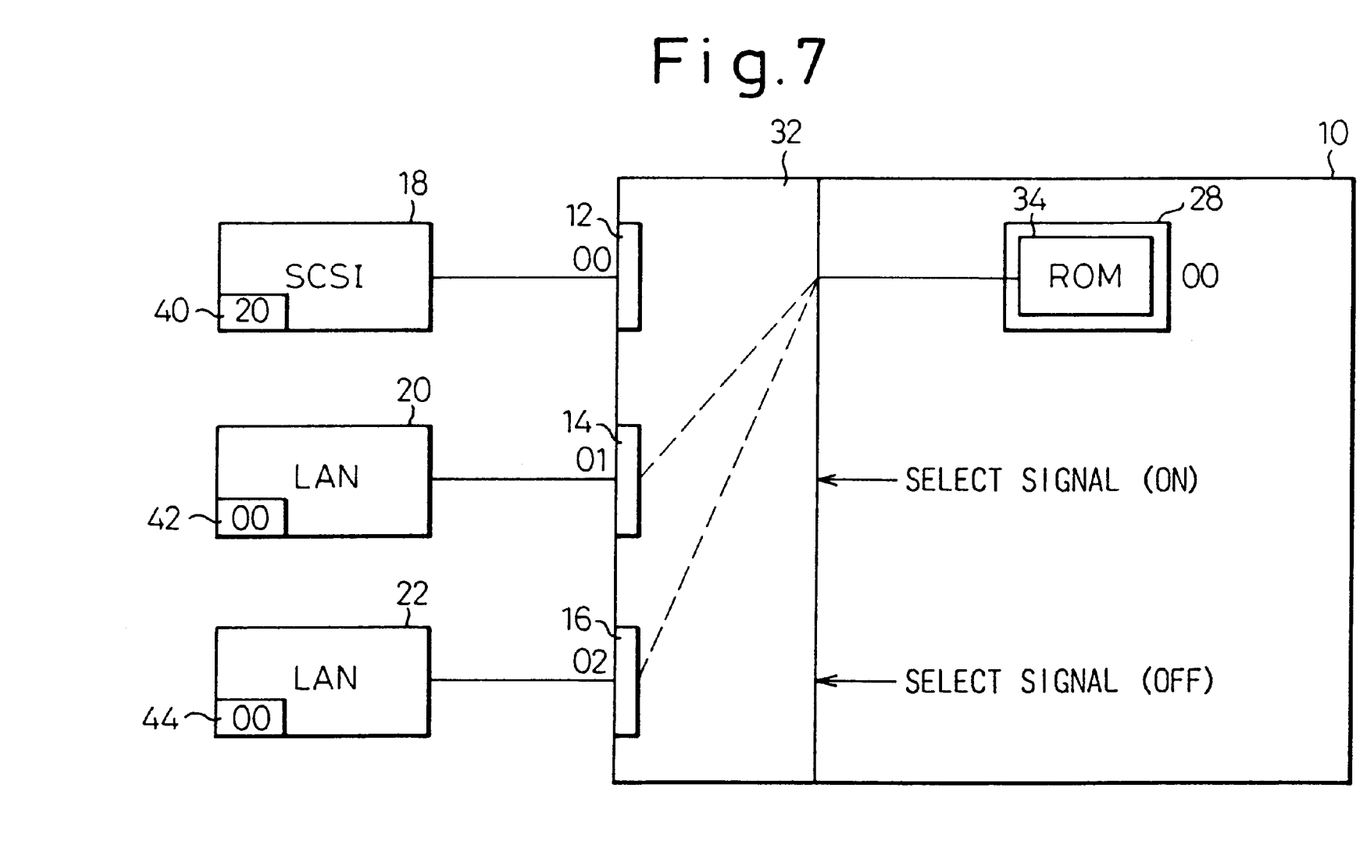
FIG. 7 is a block diagram of a LAN terminal equipment according to a third embodiment of the present invention.

FIG. 7 shows a LAN terminal equipment capable of accomplishing the primary-to-spare switching at high speed, according to a third embodiment of the present invention. In FIG. 7, the ROM IDs of the LAN control boards 20 and 22 are both set to "00, and a slot ID for identifying a slot is not stored for the MAC ROM identified by the ROM ID "00". Therefore, the LAN control boards 20 and 22 perform the same operation concurrently. The LAN control board 20 on the primary line is set ON and the LAN control board 22 on the spare line is set OFF by a select signal given from the terminal equipment 10 in setting the environment. For the LAN control board 20 which is set ON, outputs to the network and the terminal equipment are enabled, while for the LAN control board 22 which is set OFF, outputs to the network and the terminal equipment are disabled.

Figure 8:
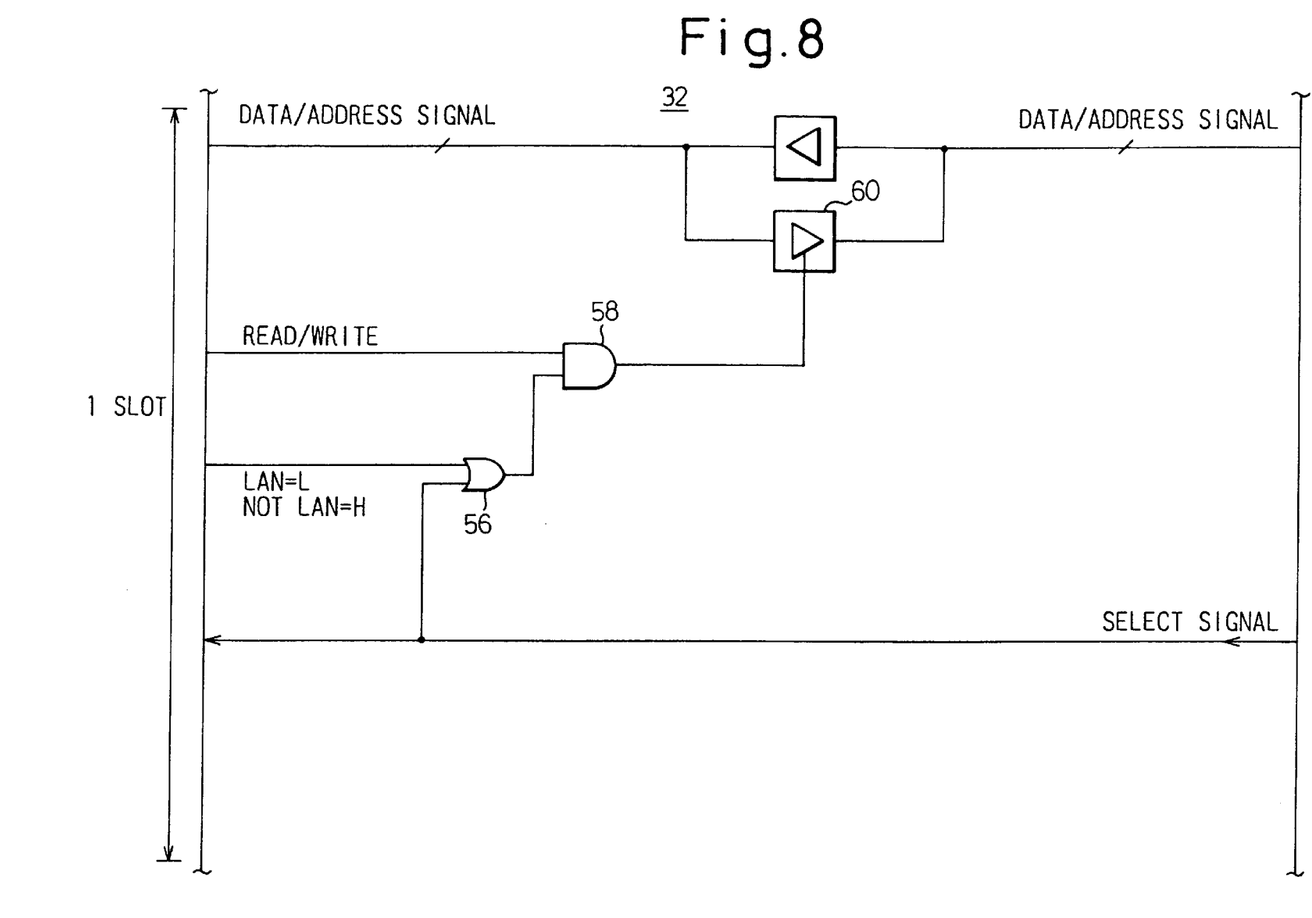
FIG. 8 is a diagram showing the details of an I/O control unit 32 in FIG. 7.

FIG. 8 shows an example of the I/O control unit 32 for implementing the above control. The difference from FIG. 4 is that the OR gate 56 is supplied with a select signal from the terminal equipment instead of the output of the comparator 52 in FIG. 4. The select signal is also supplied to the LAN control board installed in the slot. When a LAN control board is already installed in the slot, and when the select signal supplied from the terminal equipment is low (OFF), the output of the OR gate 56 is low, and data flow from the LAN control board to the terminal equipment is disallowed.

Figure 9:
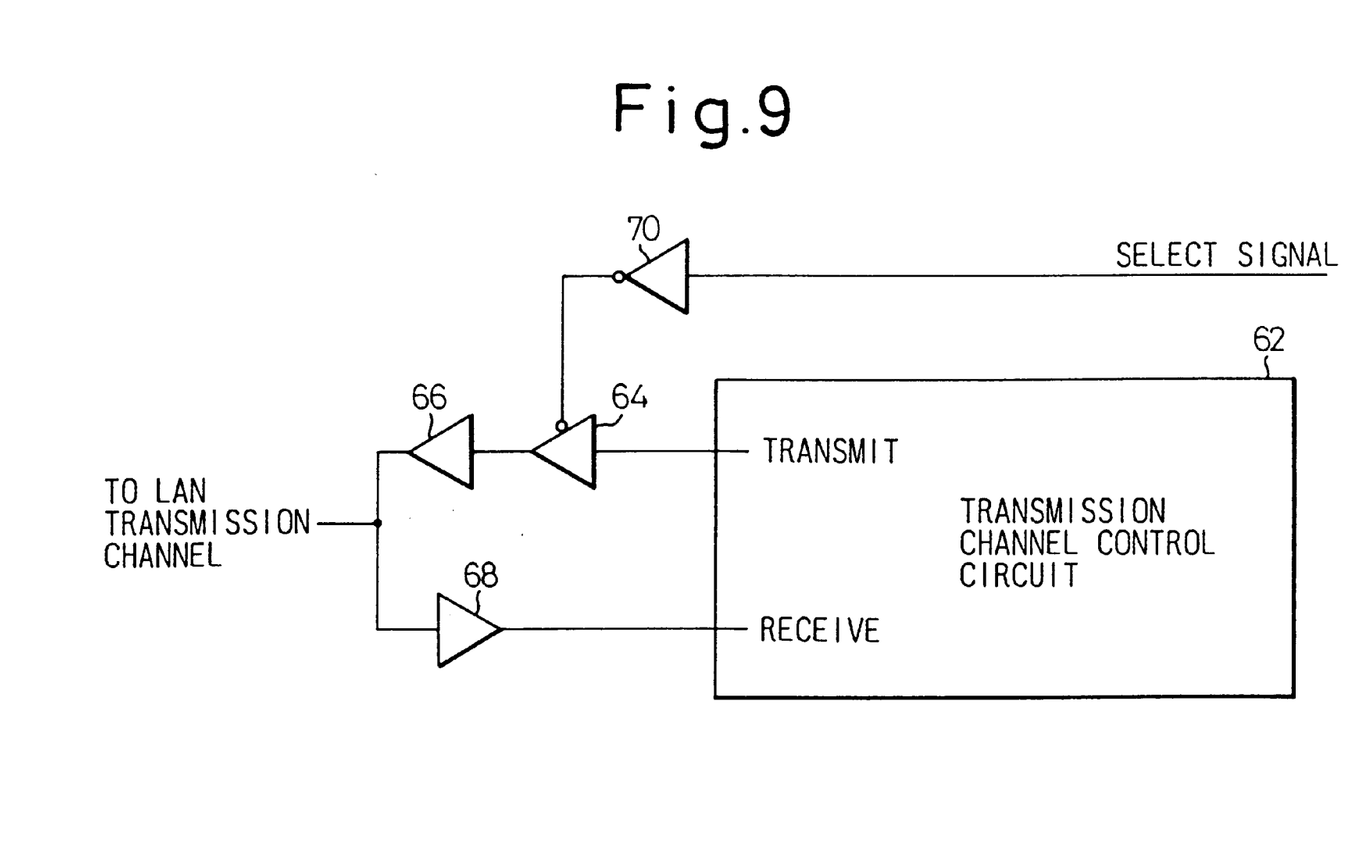
FIG. 9 is a diagram showing the details of a LAN control board in FIG. 7.

FIG. 9 shows an example of the LAN control board for implementing the above control. A transmitted signal from a transmission channel control circuit 62 is passed through a three-state buffer 64 and a line driver 66 and output on the LAN transmission channel. A received signal from the LAN transmission channel is directed to the transmission channel control circuit 62 via a line driver 68.

The select signal supplied from the terminal equipment via the I/O control unit is passed through an inverter 70 and given to the three-state buffer 64 as a control signal. When the select signal is OFF (low), the output of the three-state buffer 64 is put in a high impedance state, thus prohibiting the transmission of the transmitted signal to the LAN transmission channel.

What is claimed is:

1. A network terminal equipment, comprising:
   a plurality of slots, each slot capable of having a communication control unit installed therein;
   at least one socket capable of mounting therein a first memory device storing fixed data for use by a communication control unit associated therewith and installed in a corresponding said slot; and
   a second memory device, provided in a corresponding relationship to each of the plurality of communication control units installed in said slots, storing a first identifier identifying the socket that holds therein the first memory device storing fixed data for use by said associated communication control unit;
   the plurality of slots having respective, second identifiers;
   a third memory device, provided in corresponding relationship to each of said sockets, storing the respective second identifier identifying the slot and thereby the communication control unit that is installed therein and is associated with and allowed access to the memory device mounted in said corresponding socket; and
   an input/output control unit determining an exclusive and operative correspondence between a communication control unit installed in a corresponding said slot and the first memory device associated therewith and mounted in a respective said socket, said input/output control unit further comprising:
      a comparator comparing the second identifier of said slot with the second identifier stored in said third memory device, provided in corresponding relationship to the socket identified by the first identifier stored in the second memory device for the communication control unit installed in said slot, and
      an interrupt generating circuit generating an interrupt when a mismatch is detected in said comparator.

2. A network terminal equipment according to claim 1, wherein said input/output control unit further comprises a gate circuit prohibiting data flow from said communication control unit when a mismatch is detected in said comparator.

3. A network terminal equipment comprising:
   a plurality of slots, each slot capable of having a communication control unit installed therein;
   at least one socket capable of mounting therein a first memory device storing fixed data for use by a communication control unit associated therewith and installed in a corresponding said slot; and
   a second memory device, provided in a corresponding relationship to each of the plurality of communication control units installed in said slots, storing an identifier for identifying the socket that holds therein the first memory device storing fixed data for use by said associated communication control unit;
   a select signal generator, responsive to an identical identifier being stored for two different communication control units installed in two different slots, generating a select signal for selecting one communication control unit as a primary unit and the other as a spare unit; and
   an input/output control unit determining an exclusive and operative correspondence between a communication control unit installed in a corresponding said slot and the first memory device associated therewith and mounted in a respective said socket, said input/output control unit further comprising a gate circuit prohibiting data flow from the communication control unit selected as the spare unit by said select signal.

4. A network terminal equipment comprising:
   a plurality of slots, each slot capable of having a communication control unit installed therein;
   at least one socket capable of mounting therein a memory device storing fixed data for use by a communication control unit associated therewith and installed in a corresponding said slot;
   at least first and second communication control units, each associated with a common memory device mounted in a respective, common socket; and
   an input/output control unit selectively determining an exclusive and operative correspondence between the first and second communication control units, installed in corresponding first and second slots, and the common memory device associated therewith and mounted in a respective said socket, the input/output control unit selecting the first communication control unit as a primary unit and the second communication control unit as a spare unit and determining an exclusive and operative correspondence between the first, primary unit and the common, associated memory device in an initial operation and, upon failure of the primary unit, determining an exclusive and operative correspondence between the second, spare communication control unit and the common, associated memory device.

5. A network terminal equipment comprising:
   a plurality of slots, each slot capable of having a communication control unit installed therein;
   at least one socket capable of mounting therein a memory device storing fixed data for use by a communication control unit associated therewith and installed in a corresponding said slot;
   first and second communication control units installed in corresponding first and second slots and associated with a common memory device mounted in a respective, common socket; and
   an input/output control unit selectively determining an exclusive and operative correspondence between the first and second communication control units, installed in corresponding first and second slots, and the common memory device associated therewith and mounted in a respective said socket, the input/output control unit determining the first communication control unit to be a primary unit and the second communication control unit to be a spare communication control unit and the common memory device and, further, maintaining the primary and spare communication control units commonly accessing the common, associated memory device while determining an exclusive and operative correspondence therebetween in accordance with enabling an output of the primary communication control unit to be output from the network terminal while preventing any output of the spare communication control unit from being output from the network terminal equipment and, upon failure of the primary communication control unit, disabling the output thereof and enabling the output of the spare communication control unit to be output from the network terminal equipment.

6. A network terminal equipment according to claim 1, wherein:

the third memory devices store plural second identifiers respectively identifying plural slots in which respective, plural communication control units are installed and each second identifier identifies a respective individual slot and any communication control unit installed therein.

7. A network terminal equipment, comprising:

one or more slots capable of accommodating, respectively and by installation therein, one or more communication control units;

one or more sockets, each capable of mounting therein a memory device storing fixed data for use by a respectively associated communication control unit, installed in a respective slot and requesting access thereto, the number of slots and respective plural communication control units installed therein exceeding the number of sockets and respective memory devices mounted therein;

each of first and second communication control units, installed in respective, first and second slots, requiring an exclusive operative connection to respectively associated first and second memory devices mounted in corresponding first and second sockets and each memory device storing fixed data for use by the respectively associated communication control unit; and an input/output control unit correlating each communication control unit, installed in a respective slot and requesting access to the memory device respectively associated therewith, with the respective socket in which the respectively associated memory device is mounted and thereby selectively providing an exclusive operative connection therebetween, the input/output control unit selectively and mutually exclusively connecting the first and second communication control units, respectively, to the first and second sockets having mounted therein the first and second memory devices respectively storing fixed data for use by the corresponding, first and second communication control units installed in the respective, first and second slots.

8. A network terminal equipment comprising:

one or more slots, each slot having respective and different identifier bits and capable of accommodating, by installation therein, one or more respective communication control units;

one or more sockets, each capable of mounting therein a memory device storing fixed data for use by a respectively associated communication control unit, as installed in a respective slot and when requesting access thereto;

each communication control unit having a first further memory storing a first identifier identifying a socket having mounted therein a memory device accessible by the respectively associated communication control unit;

each socket having a second further memory therein storing a second identifier identifying a slot in which is installed a communication control unit respectively associated with the memory device mounted in the socket; and an input/output control unit correlating each communication control unit, installed in a respective slot and requesting access to the memory device respectively associated therewith, with the socket in which the memory device is mounted and thereby selectively providing an exclusive operative connection therebetween in accordance with comparing the first identifier of the first further memory of the communication control unit requesting access to the memory device respectively associated therewith with the respective, first identifier of each memory device mounted in the one or more sockets to determine a match thereof and confirming the exclusive operative connection therebetween by comparing the second identifier stored in the second further memory of the socket with the second identifier of the slot in which the communication control unit requesting access is installed.

9. A network terminal equipment according to claim 8, wherein said input/output control unit further comprises:

an interrupt generating circuit generating an interrupt when a mismatch is detected in said comparator.

10. A network terminal equipment according to claim 8, wherein said input/output control unit further comprises a gate circuit prohibiting data flow from said communication control unit when a mismatch is detected in said comparator.

11. A network terminal equipment according to claim 8 having plural slots, plural sockets and plural communication control units, further comprising:

a second memory device, provided in a corresponding relationship to each of the plural communication control units installed in said slots, storing an identifier for identifying the socket that holds therein the memory device storing fixed data for use by said associated communication control unit;

a select signal generator, responsive to an identical identifier being stored for two different communication control units installed in two different slots, generating a select signal for selecting one communication control unit as a primary unit and the other as a spare unit; and said input/output control unit further comprises a gate circuit prohibiting data flow from the communication control unit selected as the spare unit by said select signal.

12. The network terminal equipment as recited in claim 8, further comprising:

at least first and second communication control units, each associated with a common memory device mounted in a respective, common socket; and the input/output control unit selectively determines an exclusive and operative correspondence between the first and second communication control units, installed in corresponding first and second slots, and the common memory device.

13. The network terminal equipment as recited in claim 12, wherein the input/output control unit selects the first communication control unit as a primary unit and the second communication control unit as a spare unit and determines an exclusive and operative correspondence between the first, primary unit and the common, associated memory device in an initial operation and, upon failure of the primary unit, determines an exclusive and operative correspondence between the second, spare communication control unit and the common, associated memory device.

14. The network terminal equipment as recited in claim 8, further comprising:

first and second communication control units installed in corresponding first and second slots and associated with a common memory device; and the input/output control unit determining the first communication control unit to be a primary unit and the second communication control unit to be a spare communication control unit and the common memory device and, further, maintaining the primary and spare communication control units commonly accessing the common, associated memory device while determining an exclusive and operative correspondence therebetween in accordance with enabling an output of the primary communication control unit to be output from the network terminal while preventing any output of the spare communication control unit from being output from the network terminal equipment and, upon failure of the primary communication control unit, disabling the output thereof and enabling the output of the spare communication control unit to be output from the network terminal equipment.

15. A network terminal equipment according to claim 8, further comprising:

a plurality of sockets respectively holding therein a plurality of memory devices;

a plurality of communication control units; and said input/output control unit determining an exclusive and operative correspondence between each of plural communication control units installed in corresponding said slots and a respective one of the plurality of memory devices respectively mounted in said plurality of sockets.

16. The network terminal equipment as recited in claim 8, wherein:

each of first and second communication control units, installed in respective, first and second slots, requires an exclusive operative connection to respectively associated first and second memory devices mounted in corresponding first and second sockets, each memory device storing fixed data for use by the respectively associated communication control unit; and the input/output control unit selectively and mutually exclusively connects the first and second communication control units, respectively, to the first and second sockets having mounted therein the first and second memory devices respectively storing fixed data for use by the corresponding, first and second communication control units installed in the respective, first and second slots.

17. The network terminal equipment as recited in claim 16, wherein the number of slots and respective plural communication control units installed therein exceeds the number of sockets and respective memory devices mounted therein.

18. The network terminal equipment as recited in claim 8, wherein the number of slots and respective plural communication control units installed therein exceeds the number of sockets and respective memory devices mounted therein.

19. The network terminal equipment as recited in claim 16, wherein:

each of first and second communication control units, installed in respective, first and second slots, requires connection to a common memory device, respectively associated with each of the first and second communication control units and storing fixed data for use by each thereof; and the input/output control unit, selectively and mutually exclusively, connects the first communication control unit to the common memory device and maintains the second communication control unit as a standby unit, disconnected from the common memory device, and, in response to inoperativeness of the first communication control unit, selectively and mutually exclusively connects the second communication control unit to the common memory device and disconnects the first communication control unit from the common memory device.

20. The network terminal equipment as recited in claim 8, wherein:

each of first and second communication control units, installed in respective, first and second slots, requires connection to a common memory device, respectively associated with each of the first and second communication control units and storing fixed data for use by each thereof; and the input/output control unit, selectively and mutually exclusively, connects the first communication control unit to the common memory device and maintains the second communication control unit as a standby unit, disconnected from the common memory device, and, in response to inoperativeness of the first communication control unit, selectively and mutually exclusively connects the second communication control unit to the common memory device and disconnects the first communication control unit from the common memory device.

\* \* \* \* \*